United States Patent
Jiang et al.

(10) Patent No.: US 12,514,894 B2
(45) Date of Patent: Jan. 6, 2026

(54) TRADITIONAL CHINESE MEDICINE COMPOSITION FOR PREVENTING AND TREATING DIABETES, TRADITIONAL CHINESE MEDICINE PREPARATION, AND USE THEREOF

(71) Applicant: ZHEJIANG CHINESE MEDICAL UNIVERSITY, Hangzhou (CN)

(72) Inventors: Xuhong Jiang, Hangzhou (CN); Senlin Shi, Hangzhou (CN); Jingbo Xu, Hangzhou (CN); Shanshan Lu, Hangzhou (CN); Lingtian Weng, Hangzhou (CN); Yuqin Lou, Hangzhou (CN)

(73) Assignee: ZHEJIANG CHINESE MEDICAL UNIVERSITY, Hangzhou (CN)

( * ) Notice: Subject to any disclaimer, the term of this patent is extended or adjusted under 35 U.S.C. 154(b) by 274 days.

(21) Appl. No.: 18/518,089

(22) Filed: Nov. 22, 2023

(65) Prior Publication Data
US 2024/0189381 A1    Jun. 13, 2024

(30) Foreign Application Priority Data
Dec. 8, 2022    (CN) .......................... 202211581567.3

(51) Int. Cl.
| | |
|---|---|
| *A61K 36/00* | (2006.01) |
| *A61K 35/64* | (2015.01) |
| *A61K 36/284* | (2006.01) |
| *A61K 36/428* | (2006.01) |
| *A61K 36/537* | (2006.01) |
| *A61K 36/718* | (2006.01) |
| *A61K 36/734* | (2006.01) |
| *A61K 36/808* | (2006.01) |
| *A61K 36/899* | (2006.01) |
| *A61P 3/10* | (2006.01) |

(52) U.S. Cl.
CPC ............ *A61K 36/718* (2013.01); *A61K 35/64* (2013.01); *A61K 36/284* (2013.01); *A61K 36/428* (2013.01); *A61K 36/537* (2013.01); *A61K 36/734* (2013.01); *A61K 36/808* (2013.01); *A61K 36/899* (2013.01); *A61P 3/10* (2018.01); *A61K 2236/15* (2013.01); *A61K 2236/17* (2013.01); *A61K 2236/39* (2013.01)

(58) Field of Classification Search
CPC ........................................................ A61P 3/10
See application file for complete search history.

(56) References Cited

FOREIGN PATENT DOCUMENTS

CN        113893320 A  *  1/2022  .............. A61P 35/00

* cited by examiner

*Primary Examiner* — Qiuwen Mi
(74) *Attorney, Agent, or Firm* — MEDLER FERRO WOODHOUSE & MILLS PLLC

(57) ABSTRACT

The present disclosure provides a traditional Chinese medicine (TCM) composition for preventing and treating diabetes, a TCM preparation and use thereof, and belongs to the technical field of medicine. The TCM composition includes the following raw materials: 3-20 parts by weight of *Rhizoma Coptidis*, 9-24 parts by weight of *Rhizoma Atractylodis*, 6-24 parts by weight of *Feculae Bombycis*, 10-60 parts by weight of *Stigma Maydis*, 10-60 parts by weight of *Radix Trichosanthis*, 6-30 parts by weight of *Radix Scrophulariae*, 10-60 parts by weight of *Radix* et *Rhizoma Salviae* Miltiorrhizae, and 10-50 parts by weight of *Fructus Crataegi* Preparata. In the TCM composition provided by the present disclosure, all medicinal materials are synergistic to achieve the effects of clearing heat, drying dampness, fortifying the spleen, dispersing blood stasis, dispersing accumulations, lowering lipids, nourishing yin and moistening dryness.

20 Claims, No Drawings

TRADITIONAL CHINESE MEDICINE COMPOSITION FOR PREVENTING AND TREATING DIABETES, TRADITIONAL CHINESE MEDICINE PREPARATION, AND USE THEREOF

CROSS REFERENCE TO RELATED APPLICATION

This patent application claims the benefit and priority of Chinese Patent Application No. 202211581567.3, filed with the China National Intellectual Property Administration on Dec. 8, 2022, the disclosure of which is incorporated by reference herein in its entirety as part of the present application.

TECHNICAL FIELD

The present disclosure relates to the technical field of medicine, in particular to a traditional Chinese medicine (TCM) composition for preventing and treating diabetes, a TCM preparation, and use thereof.

BACKGROUND

Diabetes is a group of metabolic diseases characterized by hyperglycemia, and type 2 diabetes is mainly caused by peripheral tissue insulin resistance and insulin secretion dysfunction in islet B-cells. Epidemiological investigation shows that with the change of people's lifestyle and eating habits, type 2 diabetes has become a global epidemic with metabolic and endocrine diseases, and the prevalence of diabetes is still rising. Therefore, the prevention and treatment of type 2 diabetes has been the top priority.

At present, the main drugs for the treatment of type 2 diabetes in western medicine include sulfonylureas, biguanides, thiazolidinediones, α-glucosidase inhibitors, GLP-1 receptor agonists, DPP-4 inhibitors, SGLT2 inhibitors, subcutaneously injected insulin, and insulin analogues. However, these drugs can only temporarily control blood glucose, have a limited therapeutic effect, a single function, and a long service cycle, often require lifelong medication, and can also cause problems such as drug resistance after long-term medication. Chemical drugs further have strong stimulation to the body, toxic and side effects, easy rebound, poor safety, and susceptibility to drug resistance, and increase the economic burden of patients. In 2019, Professor Taylor published the results of a clinical study that verified reversible early type 2 diabetes. Therefore, in order to prevent and treat type 2 diabetes in the early stage and control blood glucose, it is necessary to develop and investigate a natural herb-based TCM combination for the treatment of type 2 diabetes with strong pertinence and timeliness, small toxic and side effects, good safety and remarkable efficacy.

TCM has a long history of understanding of diabetes, which belongs to the category of "dispersion-thirst disease". *The Plain Questions—Treatise on Strange Diseases* records: " . . . the person certainly eats too many sweet and fatty foods, and the fatty food makes the person endogenous heat, . . . therefore, the qi overflows and is converted into dispersion-thirst". Also, it is explicitly indicated that both predilection for sweet and fatty foods and obesity are the main cause of dispersion-thirst, and the endogenous heat is an important pathogenesis thereof. In ancient times, due to the lack of modern test and detection technologies, patients often began treatment when they had symptoms of 'eating too much, drinking too much, urinating too much, and becoming thin', in which type 2 diabetes is mostly at middle-late stage. The disease is divided into upper, center, and lower dispersions. The basic pathogenesis is characterized by yin deficiency and dryness-heat, and the disease is traditionally treated by nourishing yin and moistening dryness. However, with the development of society and the change of people's eating habits and living style, the pathogenesis and pattern type characteristics of diabetes are also changing. In particular, long-term overeating, drinking, staying up late, sedentariness, and other factors lead to abdominal obesity, overweight, and then metabolic syndrome, resulting in insulin resistance, impaired glucose tolerance, hyperglycemia, hypertension, hyperlipidemia, hyperuricemia, high blood viscosity, and other states. The patient suffers from dysfunction of spleen in transport and internal exuberance of phlegm-damp for a long time, resulting in heat transmission, damp-heat brewing and binding, and further qi stagnation and blood stasis. The pattern type is mostly dominated by damp-heat brewing in the spleen with blood stasis. Dr. Tong Xiaolin believes that with the change of living habits of modern people, diabetes patients are predominantly characterized by fat bodies and mostly manifested as damp-heat brewing in the spleen. Clinical investigation shows that with the development of medical technology and the increase of people's attention to health status, early detection of hyperglycemia is becoming more and more common, and particularly, the incidence of the pattern of damp-heat brewing in the spleen is very high, about 35%-50%. Therefore, the onset characteristics, pattern type characteristics and clinical treatment experience of existing type 2 diabetes patients find that the traditional method for nourishing yin and moistening dryness to treat "dispersion-thirst disease" has no satisfactory clinical efficacy. At present, there is no definite effective and unified recommended prescription for type 2 diabetes with pattern of damp-heat brewing in the spleen in the clinical settings of TCM.

SUMMARY

The present disclosure aims to provide a TCM composition for preventing and treating diabetes, a TCM preparation, and use thereof. All raw materials of the TCM composition provided by the present disclosure are synergistic to achieve the effects of clearing heat, drying dampness, fortifying the spleen, dispersing blood stasis, dispersing accumulations, lowering lipids, nourishing yin and moistening dryness. The TCM composition can reduce the blood glucose, blood fat and body weight of a patient effectively, improve clinical symptoms and highly viscous blood stasis state complicated with diabetes, and play roles in reversing early-stage type 2 diabetes.

To achieve the above objective, the present disclosure provides the following technical solutions:

The present disclosure provides a TCM composition for preventing and treating diabetes. The TCM composition includes the following raw materials: 3-20 parts by weight of *Rhizoma Coptidis*, 9-24 parts by weight of *Rhizoma Atractylodis*, 6-24 parts by weight of *Feculae Bombycis*, 10-60 parts by weight of *Stigma Maydis*, 10-60 parts by weight of *Radix Trichosanthis*, 6-30 parts by weight of *Radix Scrophulariae*, 10-60 parts by weight of *Radix et Rhizoma Salviae* Miltiorrhizae, and 10-50 parts by weight of *Fructus Crataegi* Preparata.

Preferably, the TCM composition includes the following raw materials: 5-15 parts by weight of the *Rhizoma Coptidis*, 12-20 parts by weight of the *Rhizoma Atractylodis*, 10-20 parts by weight of the *Feculae Bombycis*, 20-50 parts by weight of the *Stigma Maydis*, 20-50 parts by weight of the *Radix Trichosanthis*, 10-20 parts by weight of the *Radix Scrophulariae*, 15-35 parts by weight of the *Radix et Rhizoma Salviae* Miltiorrhizae, and 15-35 parts by weight of the *Fructus Crataegi* Preparata.

The present disclosure further provides a TCM preparation for preventing and treating diabetes, and the TCM preparation includes the foregoing TCM composition and pharmaceutically acceptable excipients.

Preferably, the TCM preparation includes one selected from the group consisting of a decoction, a powder, granules, a tablet, a pill, and a capsule.

Preferably, the decoction is prepared according to the following steps: mixing all raw materials of the foregoing TCM composition with 2-5 times of clean water, boiling, extracting, and filtering to obtain a filtrate, namely a TCM decoction.

Preferably, the extracting is repeated 1-3 times, for 20-60 min each time.

Preferably, the powder is prepared according to the following steps: drying all raw materials of the foregoing TCM composition, pulverizing dried raw materials to a particle size of 50-300 meshes, and mixing well to obtain a TCM powder.

Preferably, the granules are prepared according to the following steps: stirring the foregoing pulverized TCM composition well with excipients, passing through a screen, granulating to obtain wet particles, and drying the wet particles to obtain TCM granules.

The present disclosure further provides use of the foregoing TCM composition or the TCM preparation in preparation of a medicament for preventing and treating diabetes.

Preferably, the diabetes is type 2 diabetes.

Compared with the prior art, the present disclosure has the following beneficial effects:

(1) A TCM composition for preventing and treating diabetes provided by the present disclosure is selected from many years of clinical practice and repeated adjustment in combination with the understanding of pathogenesis and pattern type characteristics of patients with type 2 diabetes in TCM and the research on pharmacological functions of various medicinal materials in the formula. According to the TCM composition, eight medicinal materials are selected as raw materials to achieve scientific compatibility, and various raw materials have a synergistic effect and complementary advantages to improve type 2 diabetes on the basis of pathology. In the formula of the TCM composition, *Rhizoma Coptidis* and *Rhizoma Atractylodis* are used as sovereign drugs to play roles in clearing heat, drying dampness and fortifying the spleen. *Feculae Bombycis*, *Stigma Maydis*, *Radix Trichosanthis*, and *Radix Scrophulariae* are used as ministerial drugs to play roles in enlivening the spleen, dispelling dampness, transforming turbidity, nourishing yin, clearing heat, and engendering fluids, enhance the effects of dispelling dampness and fortifying the spleen. With the effects of nourishing yin, clearing heat, and engendering fluids, these drugs are enriching but not slimy, preventing damage to yin due to chronic damp-heat, adjunctively treating the side effects of cold bitter dampness-drying drugs, and preventing the development of diabetes to pattern of yin deficiency and dryness-heat. *Radix et Rhizoma Salviae* Miltiorrhizae and *Fructus Crataegi* Preparata are used as adjuvant and envoy drugs to play roles in activating blood circulation to dissipate blood stasis, dispersing accumulations, lowering lipids, and improving diabetes complicated with high-coagulation, high-fat and vascular diseases. In the TCM composition, all medicinal materials are synergistic to achieve the effects of clearing heat, drying dampness, fortifying the spleen, dispersing blood stasis, dispersing accumulations, lowering lipids, nourishing yin and moistening dryness. The TCM composition has a strongly targeted control effect on pathogenesis and development trend of type 2 diabetes with pattern of damp-heat brewing in the spleen, with exact clinical efficacy. The TCM composition can reduce the blood glucose, blood fat and body weight of a patient effectively, improve clinical symptoms and highly viscous blood stasis state complicated with diabetes, and play roles in reversing early-stage type 2 diabetes, reducing the dosage of hypoglycemic drugs and controlling blood glucose to reach the standard.

(2) A TCM composition or a TCM preparation for preventing and treating type 2 diabetes provided by the present disclosure is based on the overall conditioning of the physical condition of patients with type 2 diabetes. The synergistic effect among TCM components can maximize the role in controlling blood glucose and risk factors thereof. The observation of clinical efficacy shows that the TCM preparation provided by the present disclosure has a significant effect on the prevention and treatment of type 2 diabetes, especially in patients with obesity and high blood glucose (pattern of damp-heat brewing in the spleen). After use, the TCM preparation can definitely reduce blood glucose, even improve blood lipid levels, lose body weight, and reverse early type 2 diabetes. For patients with type 2 diabetes who were poorly controlled by pharmaceutical chemicals, the blood glucose decreases significantly after one-month treatment, and clinical symptoms are alleviated, helping the blood glucose control to reach the standard and even reduce the dosage of hypoglycemic drugs. In addition, the TCM composition and the TCM preparation provided by the present disclosure have the advantages of small toxic and side effects, safety and reliability due to the fact that the raw materials without non-toxic reaction are selected. That is, long-term administration thereof causes no obvious adverse reaction exists, and it is not easy to rebound after drug withdrawal. Meanwhile, a process of the TCM preparation provided by the present disclosure features controllable extraction of active pharmaceutical ingredients, high dissolution rate, excellent absorption and utilization, and convenient use.

DETAILED DESCRIPTION OF THE EMBODIMENTS

The present disclosure provides a TCM composition for preventing and treating diabetes. The TCM composition includes the following raw materials: 3-20 parts by weight of *Rhizoma Coptidis*, 9-24 parts by weight of *Rhizoma Atractylodis*, 6-24 parts by weight of *Feculae Bombycis*, 10-60 parts by weight of *Stigma Maydis*, 10-60 parts by weight of *Radix Trichosanthis*, 6-30 parts by weight of *Radix Scrophulariae*, 10-60 parts by weight of *Radix et Rhizoma Salviae* Miltiorrhizae, and 10-50 parts by weight of *Fructus Crataegi* Preparata.

In the present disclosure, the *Rhizoma Coptidis* is bitter in taste and cold in nature, and belongs to the meridians of the heart, liver, gallbladder, stomach, and large intestine. The *Rhizoma Coptidis* has the effects of clearing heat, drying dampness, purging fire for detoxication, and clearing the stomach. The *Rhizoma Coptidis* is preferably 5-15 parts by weight, and further preferably 6-12 parts by weight. The present disclosure has no special limitation on sources of the *Rhizoma Coptidis*, as long as commercially available products in the art may be used.

In the present disclosure, the *Rhizoma Atractylodis* is acrid and bitter in taste and warm in nature, and belongs to the meridians of the spleen and stomach. The *Rhizoma Atractylodis* has the effects of drying dampness, fortifying the spleen, dispelling wind-damp, resolving the exterior syndrome and improving eyesight. The *Rhizoma Atractylodis* is preferably 14-18 parts, and further preferably 15-17 parts. The present disclosure has no special limitation on sources of the *Rhizoma Atractylodis*, as long as commercially available products in the art may be used.

In the present disclosure, the *Feculae Bombycis* is sweet and acrid in taste and warm in nature, and belongs to the meridians of the liver, spleen and stomach. The *Feculae Bombycis* has the effects of dispelling wind and eliminating dampness, and harmonizing the stomach and in transforming dampness. The *Feculae Bombycis* is preferably 10-20 parts, and further preferably 12-17 parts. The present disclosure has no special limitation on sources of the *Feculae Bombycis*, as long as commercially available products in the art may be used.

In the present disclosure, the *Stigma Maydis* is sweet in taste and neutral in nature, and belongs to the meridians of the bladder, liver, and gallbladder. The *Stigma Maydis* has the effects of inducing diuresis to alleviate edema, and disinhibiting dampness to abate jaundice. The *Stigma Maydis* is preferably 20-50 parts, and further preferably 25-40 parts. The present disclosure has no special limitation on sources of the *Stigma Maydis*, as long as commercially available products in the art may be used.

In the present disclosure, the *Radix Trichosanthis* is sweet and slightly bitter in taste and slightly cold in nature, and belongs to the meridians of the lung and stomach. The *Radix Trichosanthis* has the effects of clearing heat and purging fire, engendering fluids and quenching thirst, and dispersing swelling and expelling pus. The *Radix Trichosanthis* is preferably 20-50 parts, and further preferably 25-45 parts. The present disclosure has no special limitation on sources of the *Radix Trichosanthis*, as long as commercially available products in the art may be used.

In the present disclosure, the *Radix Scrophulariae* is sweet, bitter and salty in taste and slightly cold in nature, and belongs to the meridians of the lung, stomach and kidney. The *Radix Scrophulariae* has the effects of clearing heat, cooling the blood, nourishing yin, downbearing fire, resolving toxin and dissipating binds. The *Radix Scrophulariae* is preferably 10-20 parts, and further preferably 12-18 parts. The present disclosure has no special limitation on sources of the *Radix Scrophulariae*, as long as commercially available products in the art may be used.

In the present disclosure, the *Radix et Rhizoma Salviae* Miltiorrhizae is bitter in taste and slightly cold in nature, and belongs to the meridians of heart and liver. The *Radix et Rhizoma Salviae* Miltiorrhizae has the effects of activating blood circulation to dissipate blood stasis, inducing menstruation to relieve myalgia, clearing away heart-fire and relieving restlessness, cooling the blood and dispersing welling-abscesses. The *Radix et Rhizoma Salviae* Miltiorrhizae is preferably 15-35 parts, and further preferably 18-30 parts. The present disclosure has no special limitation on sources of the *Radix et Rhizoma Salviae* Miltiorrhizae, as long as commercially available products in the art may be used.

In the present disclosure, the *Fructus Crataegi* Preparata is sour and sweet in taste and slightly warm in nature, and belongs to the meridians of the spleen, stomach and liver. The *Fructus Crataegi* Preparata has the effects of promoting digestion, invigorating the stomach, promoting qi circulation to dissipate blood stasis, transforming turbidity and lowering lipids. The *Fructus Crataegi* Preparata is preferably 15-35 parts, and further preferably 16-30 parts. The present disclosure has no special limitation on sources of the *Fructus Crataegi* Preparata, as long as commercially available products in the art may be used.

In the TCM formula provided by the present disclosure, the *Rhizoma Coptidis* and the *Rhizoma Atractylodis* are used as sovereign drugs to play roles in clearing heat, drying dampness and fortifying the spleen. The *Feculae Bombycis*, the *Stigma Maydis*, the *Radix Trichosanthis*, and the *Radix Scrophulariae* are used as ministerial drugs. The *Feculae Bombycis* enlivens the spleen, dispels dampness, and transforms turbidity; the *Stigma Maydis* disinhibits water and percolates dampness and strengthens sovereign drugs' effects of dispelling dampness and fortifying the spleen; the *Radix Trichosanthis* and the *Radix Scrophulariae* nourish yin, clear heat, and engender fluids, but are not slimy, preventing damage to yin due to chronic damp-heat, adjunctively treating the side effects of cold bitter dampness-drying drugs, and preventing the development of diabetes to pattern of yin deficiency and dryness-heat and nourishing yin. The ministerial drugs play roles in enlivening the spleen, dispelling dampness, transforming turbidity, nourishing yin, clearing heat, and engendering fluids. The *Radix et Rhizoma Salviae* Miltiorrhizae and the *Fructus Crataegi* Preparata are used as adjuvant and envoy drugs to activate blood circulation to dissipate blood stasis, disperse accumulations, lower lipids, and improve diabetes complicated with high-coagulation, high-fat and vascular diseases. All raw materials of the TCM composition are synergistic to achieve the effects of clearing heat, drying dampness, fortifying the spleen, dispersing blood stasis, dispersing accumulations, lowering lipids, nourishing yin and moistening dryness. The TCM composition can reduce the blood glucose and hyperlipidemia of a patient with type 2 diabetes with pattern of damp-heat brewing in the spleen, and improve clinical symptoms and high-coagulation and vascular diseases complicated with diabetes.

The foregoing eight traditional Chinese medicinal materials selected in the present disclosure belong to non-toxic drugs, and modern medicine does not find harmful components to the human body therein. The TCM composition features wide sources of raw materials, low cost, strong pharmacodynamic effect, high cure rate for diabetes, safety and reliability, does not have adverse reactions such as drug dependence even if the TCM composition is taken for a long time, and is not prone to rebound after drug withdrawal.

The present disclosure further provides a TCM preparation for preventing and treating diabetes, and the TCM preparation includes the foregoing TCM composition and pharmaceutically acceptable excipients.

In the present disclosure, the TCM preparation preferably includes one selected from the group consisting of a decoction, a powder, granules, a tablet, a pill, and a capsule.

In the present disclosure, the decoction is prepared according to the following steps: mixing all raw materials of the foregoing TCM composition with 2-5 times of clean water, boiling, extracting, and filtering to obtain a filtrate, namely a TCM decoction.

In the present disclosure, the extracting is preferably repeated 1-3 times, for 20-60 min each time. The present disclosure uses a water extraction method to ensure that the extraction of active pharmaceutical ingredients in each raw material of TCM is controllable with high dissolution rate, thereby exerting an objective of efficiently treating type 2 diabetes.

In the present disclosure, the powder is prepared according to the following steps: drying all raw materials of the foregoing TCM composition, pulverizing dried raw materials to a particle size of 50-300 meshes, and mixing well to obtain a TCM powder.

In the present disclosure, the raw materials of the TCM composition are dried and pulverized to 50-300 meshes, and the drying is preferably conducted at 60-80° C.

In the present disclosure, the granules are prepared according to the following steps: stirring the foregoing pulverized TCM composition well with excipients, passing through a screen, granulating to obtain wet particles, and drying the wet particles to obtain TCM granules.

In the present disclosure, the foregoing pulverized TCM composition and the excipients are stirred well, and the pulverizing preferably comprises steps of: pulverizing the TCM composition to passing through a 100-150 mesh screen, and pulverizing the excipients to passing through an 80-120 mesh screen. The excipients include a filler, a disintegrant, a flavoring agent, and a wetting agent. The filler is preferably at least one selected from the group consisting of dextrin, lactose, sucrose, calcium hydrogen phosphate, starch, anhydrous calcium hydrogen phosphate, calcium sulfate, microcrystalline cellulose, and mannitol. A dosage of the filler preferably accounts for 1-90%, more preferably 25-75%, of the weight of the granules. The disintegrant is preferably at least one selected from the group consisting of croscarmellose sodium, crospovidone, sodium carboxyl methylstarch, carboxymethylcellulose calcium, hydroxypropyl cellulose, starch, pregelatinized starch, and alginic acid. A dosage of the disintegrant preferably accounts for 0.5-20% of the weight of the granules. The flavoring agent is preferably selected from at least one of monosaccharides, sucrose, xylitol, and fragrance, and a dosage of the flavoring agent preferably accounts for 0.5-30% of the weight of the granules.

In the present disclosure, the wet particles are granulated by passing through a screen, followed by drying. For the drying, the wet particles are preferably transferred into a horizontal boiling dryer, an inlet inlet temperature is set at 80-120° C., an outlet air temperature is set at 60-80° C., and materials are dried for 15-25 min at 80° C. or below and discharged to obtain dried particles. In the present disclosure, after the dried particles are obtained, the dried particles pass through a 12-40 mesh screen to obtain the TCM granules.

The present disclosure further provides use of the foregoing TCM composition or the TCM preparation in preparation of a medicament for preventing and treating diabetes.

In the present disclosure, the diabetes is preferably type 2 diabetes, and further preferably type 2 diabetes with pattern of damp-heat brewing in the spleen. The TCM composition or the TCM preparation provided by the present disclosure has a more significant curative effect on hyperglycemia population with hyperlipidemia and abdominal obesity.

The technical solutions of the present disclosure will be clearly and completely described below with reference to the examples of the present disclosure. Apparently, the described examples are only a part of, not all of, the examples of the present disclosure. All other examples obtained by a person of ordinary skill in the art based on the examples of the present disclosure without creative efforts shall fall within the protection scope of the present disclosure.

Example 1

The TCM composition for preventing and treating diabetes in this example was composed of the following raw materials: 6 parts by weight of *Rhizoma Coptidis,* 10 parts by weight of *Rhizoma Atractylodis,* 12 parts by weight of *Feculae Bombycis,* 20 parts by weight of *Stigma Maydis,* 15 parts by weight of *Radix Trichosanthis,* 12 parts by weight of *Radix Scrophulariae,* 12 parts by weight of *Radix et Rhizoma Salviae* Miltiorrhizae, and 12 parts by weight of *Fructus Crataegi* Preparata.

A TCM preparation for preventing and treating diabetes was provided, and the method for preparing a decoction of the TCM preparation included the following steps:
 step 1, in parts by weight of the foregoing raw materials, *Rhizoma Coptidis, Rhizoma Atractylodis, Feculae Bombycis, Stigma Maydis, Radix* Trichosanthis, *Radix Scrophulariae, Radix* et *Rhizoma Salviae* Miltiorrhizae, and *Fructus Crataegi* Preparata were put into a cooking container, boiled in 3 times the quantity of clean water at 100° C. for 30 min, and filtered to obtain a filtrate A and a filter residue A for later use;
 step 2, the filter residue A obtained in step 1 was added with 2 times the quantity of water, boiled at 100° C. for 20 min, and filtered to obtain a filtrate B and a filter residue B for later use; and
 step 3, the filtrate A prepared in step 1 was mixed well with the filtrate B prepared in step 2 to obtain a TCM decoction.

Example 2

The TCM composition for preventing and treating diabetes in this example was composed of the following raw materials: 20 parts by weight of *Rhizoma Coptidis,* 24 parts by weight of *Rhizoma Atractylodis,* 24 parts by weight of *Feculae Bombycis,* 60 parts by weight of *Stigma Maydis,* 60 parts by weight of *Radix Trichosanthis,* 30 parts by weight of *Radix Scrophulariae,* 60 parts by weight of *Radix et Rhizoma Salviae* Miltiorrhizae, and 50 parts by weight of *Fructus Crataegi* Preparata.

A TCM preparation for preventing and treating diabetes was provided, and the method for preparing a decoction of the TCM preparation included the following steps:
 step 1, in parts by weight of the foregoing raw materials, *Rhizoma Coptidis, Rhizoma Atractylodis, Feculae Bombycis, Stigma Maydis, Radix* Trichosanthis, *Radix Scrophulariae, Radix* et *Rhizoma Salviae* Miltiorrhizae, and *Fructus Crataegi* Preparata were put into a cooking container, boiled in 5 times the quantity of clean water at 100° C. for 60 min, and filtered to obtain a filtrate A and a filter residue A for later use;
 step 2, the filter residue A obtained in step 1 was added with 3 times the quantity of water, boiled at 100° C. for 30 min, and filtered to obtain a filtrate B and a filter residue B for later use; and
 step 3, the filtrate A prepared in step 1 was mixed well with the filtrate B prepared in step 2 to obtain a TCM decoction.

Example 3

The TCM composition for preventing and treating diabetes in this example was composed of the following raw materials: 3 parts by weight of *Rhizoma Coptidis*, 9 parts by weight of *Rhizoma Atractylodis*, 6 parts by weight of *Feculae Bombycis*, 10 parts by weight of *Stigma Maydis*, 10 parts by weight of *Radix Trichosanthis*, 6 parts by weight of *Radix Scrophulariae*, 10 parts by weight of *Radix et Rhizoma Salviae* Miltiorrhizae, and 10 parts by weight of *Fructus Crataegi* Preparata.

A TCM preparation for preventing and treating diabetes was provided, and the method for preparing a decoction of the TCM preparation included the following steps:

step 1, in parts by weight of the foregoing raw materials, *Rhizoma Coptidis*, *Rhizoma Atractylodis*, *Feculae Bombycis*, *Stigma Maydis*, *Radix* Trichosanthis, *Radix Scrophulariae*, *Radix et Rhizoma Salviae* Miltiorrhizae, and *Fructus Crataegi* Preparata were put into a cooking container, boiled in 2 times the quantity of clean water at 100° C. for 30 min, and filtered to obtain a filtrate A and a filter residue A for later use;

step 2, the filter residue A obtained in step 1 was added with 2 times the quantity of water, boiled at 100° ° C. for 20 min, and filtered to obtain a filtrate B and a filter residue B for later use; and step 3, the filtrate A prepared in step 1 was mixed well with the filtrate B prepared in step 2 to obtain a TCM decoction.

Example 4

The TCM composition for preventing and treating diabetes in this example was composed of the following raw materials: 7 parts by weight of *Rhizoma Coptidis*, 12 parts by weight of *Rhizoma Atractylodis*, 15 parts by weight of *Feculae Bombycis*, 25 parts by weight of Stigma *Maydis*, 20 parts by weight of *Radix Trichosanthis*, 15 parts by weight of *Radix Scrophulariae*, 15 parts by weight of *Radix et Rhizoma Salviae* Miltiorrhizae, and 15 parts by weight of *Fructus Crataegi* Preparata.

A TCM preparation for preventing and treating diabetes was provided, and the method for preparing a powder of the TCM preparation included the following steps: in parts by weight of the foregoing raw materials, *Rhizoma Coptidis*, *Rhizoma Atractylodis*, *Feculae Bombycis*, *Stigma Maydis*, *Radix* Trichosanthis, *Radix Scrophulariae*, *Radix et Rhizoma Salviae* Miltiorrhizae, and *Fructus Crataegi* Preparata were each dried at 70° ° C., pulverized to a particle size of 200 meshes, and mixed well to obtain a TCM powder.

Example 5

The TCM composition for preventing and treating diabetes in this example was composed of the following raw materials: 9 parts by weight of *Rhizoma Coptidis*, 18 parts by weight of *Rhizoma Atractylodis*, 18 parts by weight of *Feculae Bombycis*, 30 parts by weight of *Stigma Maydis*, 30 parts by weight of *Radix Trichosanthis*, 18 parts by weight of *Radix Scrophulariae*, 20 parts by weight of *Radix et Rhizoma Salviae* Miltiorrhizae, and 20 parts by weight of *Fructus Crataegi* Preparata.

A TCM preparation for preventing and treating diabetes was provided, and the method for preparing granules of the TCM preparation included the following steps:

step 1, the TCM composition was pulverized to pass through a 120-mesh screen, dextrin, carboxymethylcellulose calcium and xylitol were pulverized to pass through a 100-mesh screen, and all raw materials were mixed to obtain a powder mixture;

step 2, the powder mixture pulverized in step 1 was placed in a high-speed mixing granulator, mixed and stirred, and then mixed and stirred with mannitol for 8 min; after mixing well, wet particles were granulated by passing through a 14-mesh screen; and step 3, the wet particles were transferred into a horizontal boiling dryer, the inlet air temperature was set at 100° C., the outlet air temperature was set at 70° C., materials were dried for 20 min at 80° C. or below and discharged to obtain dried particles, and the dried particles passed through a 25-mesh screen to obtain the TCM granules for preventing and treating type 2 diabetes.

Test Example 1

Mouse toxicity and safety testing was performed by using the TCM decoction prepared in Example 1:

1.1 Acute Toxicity Test

At a design dose of 20.00 g (kg·BW), 20 g/kg of the TCM decoction was weighed to prepare a test solution. Twenty ICR mice weighing 18-22 g, half male and half female, were given the test solution by gastric gavage in twice 16 h after fasting, with an interval of 4 h and a gavage capacity of 20 mL/(kg·BW); The mice were fed 4 h after the last after last gastric gavage, and the poisoning manifestations, death number and death time of animals were observed and recorded in detail. The observation period was 14 days. Animals died of poisoning and humanely sacrifice were subjected to gross autopsy immediately, and in case of abnormality, the animals were sampled for histopathological examination.

Conclusion: The acute oral maximum tolerance doses (MTD) of both male and female mice were greater than 20.00 g (kg·BW), and according to the acute toxicity grading standard, the TCM decoction was non-toxic to the mouse acute oral toxicity.

1.2 In Vivo Micronucleus Assay in Mouse Bone Marrow

The test solutions of each dose group were prepared by diluting 2.5, 5.0, and 10.0 mL of TCM decoction to 20 mL with purified water, respectively (each equivalent to 25, 50, and 100 times the recommended daily intake of an adult). For a positive control, 0.04 g of cyclophosphamide (CP) was diluted with purified water to 20 mL for later use. Fifty ICR mice weighing 25.1-30.0 g were randomly divided into three sample dose groups of 2.5, 5.0 and 10.0 mL/(kg·BW), a solvent control group (purified water) and a positive control group [CP 0.04 g/(kg·BW)] by gender and body weight, with 10 mice in each group, half male and half female. The gavage capacity was 20 mL/(kg·BW) each time, and the femoral bone marrow was suspended in calf serum for direct smear, methanol fixation, and Giemsa staining 6 h after the second gastric gavage. Microscopy showed 1000 polychromatic erythrocytes (PCEs)/mouse, and the number of micronucleated PCEs was counted. The number of normochromatic erythrocytes (NCEs) observed was counted while 200 PCEs per animal was observed. The ratio of both (PCE/NCE) was calculated. The results are as follows (see Table 1).

TABLE 1

TCM decoction results on in vivo micronucleus assay in mouse bone marrow ($\bar{x} \pm s$)

| Gender | Group | Number of PCEs/n | Number of micronucleated PCEs/n | Frequency of micronucleated cells/‰ | PCE/NCE |
|---|---|---|---|---|---|
| Female | 0.0 mL/(kg · BW) | 1000 × 5 | 8 | 1.42 ± 1.12 | 1.14 ± 0.23 |
| | 2.5 mL/(kg · BW) | 1000 × 5 | 9 | 1.83 ± 1.31 | 1.05 ± 0.14 |
| | 5.0 mL/(kg · BW) | 1000 × 5 | 10 | 2.28 ± 0.84 | 1.12 ± 0.15 |
| | 10.0 mL/(kg · BW) | 1000 × 5 | 7 | 1.81 ± 1.11 | 1.08 ± 0.19 |
| | CP 0.04 g/(kg · BW) | 1000 × 5 | 88 | 15.64 ± 5.16* | 1.02 ± 0.18 |
| Male | 0.0 mL/(kg · BW) | 1000 × 5 | 7 | 1.50 ± 0.65 | 1.09 ± 0.08 |
| | 2.5 mL/(kg · BW) | 1000 × 5 | 8 | 1.41 ± 1.04 | 1.05 ± 0.11 |
| | 5.0 mL/(kg · BW) | 1000 × 5 | 10 | 1.84 ± 0.88 | 1.12 ± 0.12 |
| | 10.0 mL/(kg · BW) | 1000 × 5 | 9 | 1.88 ± 0.84 | 1.16 ± 0.13 |
| | CP 0.04 g/(kg · BW) | 1000 × 5 | 78 | 17.57 ± 4.87* | 1.03 ± 0.16 |

NOTE:
*indicates that it is statistically significant (P < 0.01) compared with the negative control group.

Conclusion: The TCM decoction group showed no significant difference in the frequency of micronucleated cells from the negative control group, and a significant difference from the positive control group, indicating that the TCM decoction group has no influence on mouse micronuclei.

1.3 Sperm Abnormality Test in Mice

The dose planning and preparation methods of the positive control and samples are shown in the in vivo micronucleus assay in mouse bone marrow. Twenty-five healthy male ICR mice weighing 25.3-29.8 g were randomly divided into three sample dose groups of 2.5, 5.0 and 10.0 mL/(kg·BW), a solvent control group (purified water), and a positive control group [CP 0.04 g/(kg·BW)] by body weight, with five mice in each group. Animals in each group were given gastric gavage once a day for five consecutive days, and the gavage capacity was 20 mL/(kg·BW). At 35 days after the first administration of the test solution, the mice were sacrificed, bilateral epididymides were removed, and the epididymides were cut longitudinally with ophthalmic scissors, filtered, smeared, dried, fixed with methanol, stained with 2% (m:V) eosin, and microscopically observed.

1.4 Salmonella typhimurium/Mammals Microsomal Enzyme Test (Ames Test)

The TCM decoction (20 mL) was sterilized at 121° C. for 20 min as a test solution. During the test, 0.1 mL of the test solution was added to each dish in the highest dose group, namely 5 μL/dish, and there was no contamination or inhibition during the pre-test. In the formal test, the test solution in the highest dose group was serially diluted 5 times with sterile purified water successively, and prepared into four test solutions with doses of 1, 0.2, 0.04, and 0.008 μL/dish, and five sample dose groups were formed. In addition, a solvent control group (sterile purified water), a blank control group (spontaneous reverse mutation group) and four positive control groups were set up. The solvents and dosages required for the preparation of positive controls sodium azide, Dexon, 2-aminofluorene and 1,8-dihydroxyanthraquinone are shown in Table 1. Sequentially, 0.1 mL each of the fresh enrichment broth of tester strain and the test solution were added into a top-layer culture medium held in a 45° C. water bath, 0.5 mL of 10% (V:V) S9 mixture was added when activated, and an equal volume of 0.2 mol/L pH7.4 phosphate buffer saline (PBS) was added without

TABLE 2

TCM decoction results on sperm abnormality test in mice ($\bar{x} \pm s$, n ± 5)

| Group | Number of inspected sperms/n | Type of abnormal sperms | | | | | | | Total number of abnormal sperms/n | Abnormality rate/% |
|---|---|---|---|---|---|---|---|---|---|---|
| | | Hookless | Banana-like | Large | Amorphous | Two-head | Two-tailed | Folded | | |
| 0.0 mL/(kg · BW) | 1000 × 5 | 26 | 3 | 1 | 32 | 0 | 0 | 1 | 63 | 1.56 ± 0.28 |
| 2.5 mL/(kg · BW) | 1000 × 5 | 33 | 2 | 2 | 38 | 0 | 1 | 0 | 76 | 1.84 ± 0.35 |
| 5.0 mL/(kg · BW) | 1000 × 5 | 24 | 1 | 2 | 20 | 2 | 0 | 2 | 61 | 1.43 ± 0.38 |
| 10.0 mL/(kg · BW) | 1000 × 5 | 29 | 1 | 1 | 28 | 1 | 2 | 0 | 62 | 1.63 ± 0.46 |
| CP 0.04 g/(kg · BW) | 1000 × 5 | 169 | 8 | 7 | 157 | 3 | 7 | 6 | 357 | 6.49 ± 0.74** |

NOTE:
**indicates that it is statistically significant (P < 0.01) compared with the negative control group.

Conclusion: The TCM decoction group showed no significant difference in mouse sperm abnormality rate from the negative control group and a significant difference from the CP group, indicating that the TCM decoction has no influence on sperm abnormality.

activation; after mixing well, the mixture was rapidly poured onto the bottom-layer culture medium, and the plate was rotated to uniformly distribute the top-layer culture medium on the bottom layer. After the plate was cured and cultured at 37° C. for 48 h, results were observed. Three parallel samples were set for each dose.

TABLE 3

Ames test results of TCM decoction ($\bar{x} \pm s$, n = 3)

| Group | TA97a +S9 | TA97a −S9 | TA98 +S9 | TA98 −S9 | TA100 +S9 | TA100 −S9 | TA102 +S9 | TA102 −S9 |
|---|---|---|---|---|---|---|---|---|
| Test 1 | | | | | | | | |
| Spontaneous reverse mutation | 118 ± 8 | 106 ± 7 | 42 ± 2 | 39 ± 4 | 143 ± 9 | 121 ± 12 | 277 ± 11 | 249 ± 9 |
| Solvent control | 122 ± 7 | 112 ± 10 | 44 ± 5 | 42 ± 7 | 158 ± 12 | 136 ± 14 | 289 ± 7 | 273 ± 13 |
| 0.008 μL/dish | 129 ± 8 | 118 ± 6 | 41 ± 4 | 44 ± 3 | 152 ± 6 | 131 ± 8 | 266 ± 5 | 258 ± 9 |
| 0.04 μL/dish | 131 ± 11 | 126 ± 9 | 47 ± 6 | 51 ± 6 | 147 ± 8 | 145 ± 7 | 271 ± 12 | 256 ± 13 |
| 0.2 μL/dish | 154 ± 13 | 152 ± 7 | 38 ± 3 | 37 ± 2 | 142 ± 7 | 136 ± 6 | 262 ± 11 | 255 ± |
| 1 μL/dish | 148 ± 10 | 122 ± 9 | 41 ± 2 | 38 ± 5 | 156 ± 7 | 146 ± 8 | 277 ± 5 | 264 ± 9 |
| 5 μL/dish | 152 ± 6 | 137 ± 5 | 39 ± 4 | 40 ± 6 | 162 ± 4 | 158 ± 6 | 263 ± 10 | 259 ± 11 |
| Positive control | 984 ± 78 | 1013 ± 69 | 1094 ± 110 | 1091 ± 80 | 1174 ± 93 | 985 ± 112 | 1058 ± 86 | 973 ± 86 |
| Test 2 | | | | | | | | |
| Spontaneous reverse mutation | 115 ± 9 | 109 ± 5 | 37 ± 8 | 34 ± 6 | 151 ± 10 | 148 ± 13 | 274 ± 7 | 261 ± 11 |
| Solvent control | 121 ± 7 | 118 ± 3 | 39 ± 3 | 33 ± 9 | 154 ± 8 | 144 ± 10 | 279 ± 12 | 258 ± 14 |
| 0.008 μL/dish | 132 ± 4 | 129 ± 3 | 43 ± 2 | 32 ± 4 | 158 ± 14 | 138 ± 11 | 278 ± 7 | 245 ± 4 |
| 0.04 μL/dish | 134 ± 6 | 119 ± 4 | 35 ± 8 | 34 ± 7 | 159 ± 5 | 141 ± 7 | 285 ± 6 | 241 ± 9 |
| 0.2 μL/dish | 138 ± 3 | 115 ± 9 | 44 ± 9 | 43 ± 3 | 154 ± 3 | 138 ± 2 | 279 ± 13 | 253 ± 10 |
| 1 μL/dish | 151 ± 5 | 138 ± 4 | 33 ± 4 | 35 ± 3 | 149 ± 2 | 137 ± 3 | 271 ± 8 | 274 ± 7 |
| 5 μL/dish | 139 ± 12 | 121 ± 4 | 43 ± 2 | 39 ± 4 | 145 ± 8 | 138 ± 7 | 269 ± 7 | 276 ± 5 |
| Positive control | 1061 ± 84 | 1027 ± 98 | 1049 ± 94 | 1091 ± 78 | 1171 ± 91 | 987 ± 117 | 1085 ± 91 | 973 ± 76 |

Conclusion: Regardless of addition of S9, in two duplicate tests, the number of revertant colonies of each of four strains in the solvent control group was equivalent to that in the corresponding spontaneous reverse mutation group, and that of each of four strains in the positive control group reached more than twice that of the corresponding solvent control, indicating that the test system is sensitive and reliable. Under the condition that the highest dose reached 5 L/dish, the number of revertant colonies of each of standard tester strains TA97a, TA98, TA100, and TA102 in each sample dose group did not exceed twice the corresponding value of the solvent control and showed no dose-response relationship, and the result was reproducible, indicating that the TCM decoction has no obvious mutagenic activity.

1.5 Rat 30-Days Feeding Test

Animals were randomly divided into four groups of 10 animals, half male and half female, which were used as three sample dose groups (10, 20, and 40 g/kg of crude drug) and a blank control group. Each animal was housed in a single cage, given ad libitum access to food and water, fed for 30 consecutive days, and weighed once a week at the beginning of and after the experiment. After 30 days of continuous feeding, the rats were weighed one by one, and the rat blood was collected for hematologic studies and chemistry panel. The rats were sacrificed. After gross anatomy, the presence of obvious lesions was observed by naked eyes, and the organs such as the liver, the kidneys, the spleen, and the sexual organ were weighed. The organ-to-body ratio was calculated, and histopathological examinations were performed on the liver, kidneys, spleen, gastrointestinal tract and sexual organs.

TABLE 4

Thirty-day feeding test results of rat hematologic studies ($\bar{x} \pm s$, n = 10)

| Gender | Dose g/ (kg · BW) | Hemochrome/ (g/L) | Red blood cell (RBC)/($10^{12}$/L) | White blood cell (WBC)/($10^9$/L) | Neutrophil percentage/% | Lymphocyte percentage/% |
|---|---|---|---|---|---|---|
| Male | 0 | 150.70 ± 7.38 | 7.09 ± 0.31 | 10.49 ± 1.67 | 25.46 ± 5.54 | 74.54 ± 5.54 |
| | 10 | 146.80 ± 11.87 | 7.43 ± 0.35 | 10.77 ± 0.36 | 27.90 ± 7.37 | 72.10 ± 7.37 |
| | 20 | 153.40 ± 10.28 | 6.97 ± 0.31 | 10.36 ± 4.81 | 27.84 ± 8.02 | 72.16 ± 8.02 |
| | 40 | 149.80 ± 9.73 | 7.05 ± 0.23 | 9.56 ± 4.01 | 28.55 ± 10.12 | 71.45 ± 10.12 |
| Female | 0 | 146.60 ± 7.62 | 6.76 ± 0.27 | 10.19 ± 3.31 | 27.22 ± 7.75 | 72.78 ± 7.75 |
| | 10 | 148.40 ± 10.34 | 6.94 ± 0.45 | 10.79 ± 2.26 | 22.38 ± 4.93 | 77.62 ± 4.93 |
| | 20 | 148.50 ± 6.94 | 7.04 ± 0.73 | 10.57 ± 1.73 | 26.88 ± 3.19 | 73.12 ± 3.19 |
| | 40 | 153.10 ± 15.91 | 6.97 ± 0.81 | 10.08 ± 2.81 | 29.09 ± 3.71 | 70.91 ± 3.71 |

TABLE 5

The effects of feeding of the TCM decoction for 30 days on organ weights and organ-to-body ratio of rats ($\bar{x} \pm s$, n = 10)

| Gender | Dose g/ (kg · BW) | Kidney (g) | Kidney/ Body weight (%) | Spleen (g) | Spleen/ Body weight (%) | Liver (g) | Liver/ Body weight (%) | Testis (g) | Testis/ Body weight (%) |
|---|---|---|---|---|---|---|---|---|---|
| Male | 0 | 2.91 ± 0.33 | 0.69 ± 0.02 | 1.41 ± 0.23 | 0.32 ± 0.06 | 14.09 ± 1.21 | 3.08 ± 0.32 | 4.07 ± 0.26 | 0.83 ± 0.12 |
|  | 10 | 2.88 ± 0.29 | 0.62 ± 0.14 | 1.39 ± 0.15 | 0.35 ± 0.09 | 13.37 ± 1.34 | 2.97 ± 0.25 | 3.69 ± 0.39 | 0.83 ± 0.16 |
|  | 20 | 2.98 ± 0.22 | 0.69 ± 0.03 | 1.44 ± 0.13 | 0.31 ± 0.05 | 14.71 ± 1.07 | 3.11 ± 0.38 | 4.23 ± 0.34 | 0.91 ± 0.08 |
|  | 40 | 3.08 ± 0.31 | 0.68 ± 0.05 | 1.58 ± 0.11 | 0.36 ± 0.02 | 14.41 ± 1.38 | 3.03 ± 0.36 | 4.15 ± 0.37 | 0.88 ± 0.12 |
| Female | 0 | 2.16 ± 0.19 | 0.64 ± 0.16 | 1.07 ± 0.13 | 0.32 ± 0.06 | 10.28 ± 1.27 | 3.04 ± 0.41 | — | — |
|  | 10 | 2.23 ± 0.22 | 0.62 ± 0.17 | 1.07 ± 0.12 | 0.36 ± 0.04 | 10.54 ± 1.42 | 3.13 ± 0.44 | — | — |
|  | 20 | 2.11 ± 0.18 | 0.61 ± 0.14 | 1.18 ± 0.06 | 0.38 ± 0.04 | 10.09 ± 1.08 | 3.02 ± 0.35 | — | — |
|  | 40 | 2.18 ± 0.12 | 0.68 ± 0.18 | 1.09 ± 0.08 | 0.37 ± 0.02 | 10.71 ± 1.12 | 3.08 ± 0.32 | — | — |

Conclusion: The rats fed with the TCM decoction for 30 days basically grew well. Examination results of hemochrome, RBC, WBC and their classification were all within the normal range. Histological examination results of the primary organs such as liver, kidneys, spleen, gastrointestinal tract, and sexual organ did not find the diseases associated with the test.

Test Example 2

The experiment related to lowering of blood glucose in rats with type 2 diabetes was performed by using the TCM decoction prepared in Example 1:

Sample Description: The sample was a brown liquid.

Dose Planning: Low-, medium- and high-dose groups were designed in this experiment: 10 g (crude drug)/kg, 20 g (crude drug)/kg, and 40 g (crude drug)/kg. The dose groups were given by gastric gavage for 30 consecutive days, and the control group was given an equal quantity of normal saline.

Experimental Method 2.1 Animal Model

SD rats with diabetes of dampness-heat pattern were modeled with reference to the 2014 edition of the *Ideas and Methods of Clinical-mimetic Research on Integrated Animal Models of Disease and Syndrome*. The specific method was as follows: Sixty specific pathogen-free (SPF) grade male Sprague-Dawley (SD) rats weighing 160-180 g were selected, 10 male SD rats were assigned to a normal control group, and the rest 50 ones were fasted but not deprived of water for 16-18 h (21:00 PM to 14:00 PM the next day); STZ was prepared into a 1.0% solution with 0.1 mmol·L$^{-1}$ citric acid buffer (pH=4.2, 4° C.), and the rats were fed with high-sugar and high-fat diet on Day 3 after tail vein injection of 10 mg kg$^{-1}$ STZ; the type 2 diabetes model was replicated by continuous high-sugar and high-fat feeding for 6-8 weeks (impaired glucose tolerance was deemed as successful modeling), and the normal control group was fed with normal diet. Later, after all rats were fed with normal animal feed and normally drank water for one week, they fasted but not deprived of water for 12 h; the tails of the rats were disinfected with alcohol, and the fasting plasma glucose of the rats was measured by tail vein blood sampling. If the rats showed polydipsia, polyphagia, obesity, lethargy, loose and rough hair, dark yellow and dull hair, and fasting plasma glucose value higher than 11.1 mmol/L, it indicated that the modeling was successful. After the successful modeling, the rats were given normal animal feed and access to water ad libitum for one week, so as to detect the stability of the model.

2.2 Experimental Method

After the successful modeling, 50 rats were divided into a model control group, a positive control group, a low-dose TCM decoction group, a medium-dose TCM decoction group, and a high-dose TCM decoction group. Ten rats in the blank control group were given access to ordinary animal feed and water ad libitum, and an equal volume of normal saline was administered daily by gastric gavage. Ten rats in the model control group were given access to ordinary animal feed and water ad libitum, and an equal volume of normal saline was administered daily by gastric gavage. Ten rats in the positive control group were given access to ordinary animal feed and water ad libitum, and 0.25 g/kg metformin was administered daily by gastric gavage. Ten rats in the low-dose TCM decoction group were given access to ordinary animal feed and water ad libitum, and 10 g (crude drug)/kg TCM decoction was administered daily by gastric gavage. Ten rats in the medium-dose TCM decoction group were given access to ordinary animal feed and water ad libitum, and 20 g (crude drug)/kg TCM decoction was administered daily by gastric gavage. Ten rats in the high-dose TCM decoction group were given access to ordinary animal feed and water ad libitum, and 40 g (crude drug)/kg TCM decoction was administered daily by gastric gavage. All rats were fed for a total of 30 days. Rat body weight, fasting plasma glucose, and insulin level were measured before and after SD rat modeling and after gastric gavage.

2.3 Experimental Results: Tables 6 to 8

TABLE 6

Rat body weight changes ($\bar{x} \pm s$, n = 10)

| Group | Body weight before modeling/g | Body weight after modeling/g | Body weight before administration/g |
|---|---|---|---|
| Blank control | 164.5 ± 9.5 | 335.6 ± 11.5 | 415.3 ± 18.5 |
| Model control | 173.0 ± 8.6 | 453.7 ± 15.6 | 553.6 ± 20.6 |
| Positive control | 166.3 ± 10.8 | 463.5 ± 17.3 | 435.4 ± 25.3 |

TABLE 6-continued

Rat body weight changes ($\bar{x} \pm s$, n = 10)

| Group | Body weight before modeling/g | Body weight after modeling/g | Body weight before administration/g |
|---|---|---|---|
| Low-dose TCM decoction | 159.2 ± 9.3 | 443.2 ± 12.5 | 445.6 ± 20.8 |
| Medium-dose TCM decoction | 165.5 ± 9.6 | 460.2 ± 15.2 | 425.7 ± 23.5 |
| High-dose TCM decoction | 160.2 ± 9.5 | 465.5 ± 16.2 | 395.2 ± 24.2 |

Table 6: After modeling, the body weight of the model rats is significantly higher than that of the blank control rats, and the difference is statistically significant (P<0.05). After administration, the body weight of rats in the positive control group and the three TCM decoction groups is lower than that in the model control group, and the difference is statistically significant (P<0.05). The body weight of rats in the low- and medium-dose TCM decoction groups is not statistically significant from that in the positive control group (P>0.05). The body weight of rats in the high-dose TCM group is lower than that in the positive control group, and the difference is statistically significant (P<0.05).

TABLE 7

Rat fasting plasma glucose levels ($\bar{x} \pm s$, n = 10, in mmol/L)

| Group | Blood glucose before modeling | Blood glucose after modeling | Blood glucose after administration |
|---|---|---|---|
| Blank control | 6.05 ± 0.52 | 6.15 ± 0.64 | 6.05 ± 0.48 |
| Model control | 5.95 ± 0.50 | 19.86 ± 3.65 | 20.05 ± 3.54 |
| Positive control | 6.02 ± 0.48 | 20.15 ± 3.23 | 6.65 ± 1.39 |
| Low-dose TCM decoction | 6.15 ± 0.55 | 20.45 ± 4.12 | 8.77 ± 1.76 |
| Medium-dose TCM decoction | 5.92 ± 0.64 | 19.88 ± 3.15 | 7.18 ± 1.22 |
| High-dose TCM decoction | 6.22 ± 0.63 | 21.12 ± 3.96 | 5.76 ± 0.84 |

Table 7: After modeling, the fasting plasma glucose of the model rats is significantly higher than that of the rats before modeling, and the difference is statistically significant (P<0.05). After administration, the fasting plasma glucose of rats in the positive control group and the three TCM decoction groups is significantly lower than that after modeling, and the difference is statistically significant (P<0.05). The fasting plasma glucose of rats in the low-dose TCM decoction group is higher than that in the positive control group, and the difference is statistically significant (P<0.05). There is no significant difference in fasting plasma glucose between the medium-dose TCM decoction group and the positive control group (P>0.05). The fasting plasma glucose of rats in the high-dose TCM decoction group is lower than that in the positive control group, and the difference is statistically significant (P<0.05).

TABLE 8

Rat insulin levels ($\bar{x} \pm s$, n = 10, in uIU/mL)

| Group | Before administration | After administration |
|---|---|---|
| Blank control | 37.52 ± 3.78 | 35.23 ± 3.12 |
| Model control | 74.38 ± 8.96 | 73.44 ± 8.22 |
| Positive control | 73.45 ± 9.45 | 44.13 ± 5.42 |
| Low-dose TCM decoction | 76.56 ± 9.15 | 56.37 ± 6.15 |
| Medium-dose TCM decoction | 72.25 ± 8.41 | 46.27 ± 5.23 |
| High-dose TCM decoction | 73.22 ± 9.13 | 37.18 ± 4.59 |

Table 8: The insulin levels of the model rats are significantly higher than those of the blank control group, and the difference is statistically significant (P<0.05). After administration, the insulin levels of rats in the positive control group and the three TCM decoction groups are significantly lower than those after modeling, and the difference is statistically significant (P<0.05). The insulin levels of rats in the low-dose TCM decoction group are higher than those in the positive control group, and the difference is statistically significant (P<0.05). There is no significant difference in insulin level between the medium-dose TCM decoction group and the positive control group (P>0.05). The insulin levels of rats in the high-dose TCM decoction group are lower than those in the positive control group, and the difference is statistically significant (P<0.05).

Test Example 3

Observation of clinical efficacy in the improvement of patients with type 2 diabetes with pattern of damp-heat brewing in the spleen was performed by using the TCM decoction preparation prepared in Example 1:

Source of Cases: Forty-nine patients with type 2 diabetes with pattern of damp-heat brewing in the spleen from the outpatient clinic and endocrinology wards between July 2021 and July 2022 were selected as subjects and randomly divided into two groups: an observation group (n=24) and a control group (n=25). Through the self-made diabetes questionnaire survey, it was determined that all the subjects met the corresponding diagnostic criteria of TCM and Western medicine, as well as inclusion and exclusion criteria.

3.1 Diagnostic, Inclusion and Exclusion Criteria 3.1.1 Diagnostic criteria were as follows: (1) T2DM diagnostic criteria were formulated with reference to the *Guidelines for the Prevention and Control of Type 2 Diabetes in China* (2020 Edition) (Volume I). (2) The TCM criteria were formulated with reference to the *Traditional Chinese Medicine Disease Diagnosis and Efficacy Standards* issued by the National Administration of Traditional Chinese Medicine, and TCM syndrome differentiation was carried out according to the reference.

3.1.2 Inclusion criteria included: (1) those who met the foregoing diagnostic criteria of TCM and Western medicine; (2) those who met the syndrome differentiation of pattern of damp-heat brewing in the spleen; (3) those who still had poor outcomes after long-term routine oral administration of hypoglycemic drugs; (4) those aged 18-75 years, without gender preference; and (5) patients who agreed to this therapeutic regimen and signed the informed consent form.

3.1.3 Exclusion criteria included: (1) patients with other types of diabetes; (2) patients with diabetic emergency, such as ketoacidosis and hyperosmolar coma, in the past one month; (3) patients complicated with severe organic lesions in important organs including heart, brain, kidneys, and lung, or with hematological diseases and neurological dysfunction, or with diabetic nephropathy, peripheral neuropathy, leg ulcer and other chronic complications, or with acute and chronic infectious diseases; (4) patients complicated with digestive system diseases and treated with antibiotics, steroids, immunosuppressants and probiotics within three months; (5) pregnant and lactating women and those with severe allergic constitution; and (6) those who were on other TCM treatment simultaneously to influence the efficacy evaluation.

3.1.4 Dropout and elimination criteria included: (1) patients with other special conditions who needed to take a drug that affects the test result or change the therapeutic regimen; (2) patients who lacked relevant data and information to affect the final results of this trial; and (3) patients who voluntarily requested to withdraw from the trial during the trial.

3.2 Grouping: The observation group (Group 1) was on Western medicine-based standard treatment plus the TCM decoction provided by the present disclosure, twice a day, with the dose of the TCM decoction being 150 mL each time; at the same time, reasonable dietary and exercise instructions were provided. The control group (gGroup 2) was on Western medicine-based standard treatment, and reasonable dietary and exercise g instructions were provided, for 30 consecutive days.

3.3 Observation indexes included: body weight, body mass index (BMI), fasting plasma glucose (FPG), postprandial blood glucose (PBG), TCM symptom score, and diabetes specific quality of life (DSQL) score.

3.4 Outcome indexes: Before treatment and 30 days after treatment, two groups were evaluated by body weight, BMI, FPG, 2-hour postprandial blood glucose (2h-PBG), TCM syndrome score (quantitative scale of diabetic symptom classification), and DSQL scale. TCM syndromes were evaluated by TCM practitioners with related professional knowledge. One month after treatment, clinical outcome assessment was carried out, and clinical outcome measures (by TCM syndrome score) included: marked response: FPG<7.0 mmol/L or PBG<11.1 mmol/L, the symptoms disappeared basically or completely, and the syndrome score was reduced by ≥70% or was 0; moderate response: FPG or 2h-PBG was improved compared with that before treatment, the symptoms were improved significantly, and the syndrome score was reduced by 30% to <70%; no response: FPG or 2h-PBG was not improved compared with that before treatment, or the symptoms were basically not improved, and the syndrome score was reduced by <30%; and aggravation: FPG or 2h-PBG was increased compared with that before treatment, or the syndrome score exceeded the pre-treatment score. Total response rate=(Marked response+Moderate response)/Total number of cases×100%. The response rate was compared between two groups.

3.5 Results of Clinical Observation Trial: Tables 9 to 14

TABLE 9

Comparison of baseline data of patients

| Baseline data | Group 1 (n = 24) | Group 2 (n = 25) | Statistic value | P value |
|---|---|---|---|---|
| Body weight x ± s (kg) | 73.4 ± 11.7 | 69.5 ± 10.1 | t = 1.24 | 0.220 |
| BMI x ± s | 26.3 ± 3.5 | 25.3 ± 3.0 | t = 1.02 | 0.310 |
| FPG M ($P_{25}$, $P_{75}$) (mmol/L) | 7.8 (6.9, 9.2) | 8.0 (7.2, 8.7) | z = 0.26 | 0.795 |
| PBG M ($P_{25}$, $P_{75}$) (mmol/L) | 12.9 (10.4, 13.9) | 11.5 (10.0, 13.7) | z = 1.07 | 0.284 |
| TCM score M ($P_{25}$, $P_{75}$) | 41.5 (20.0, 63.2) | 42 (23, 70) | z = 0.68 | 0.496 |
| DSQL score M ($P_{25}$, $P_{75}$) | 73.5 (52.2, 111.0) | 59.0 (41.0, 104.5) | z = 0.99 | 0.322 |

Table 9: There were no statistical differences in baseline data such as body weight, BMI, FPG, PBG, TCM score, and DSQL score between two groups of patients (all P>0.05).

TABLE 10

Comparison of all data of patients after treatment

| Post-treatment data | Group 1 (n = 24) | Group 2 (n = 25) | Statistic value | P value |
|---|---|---|---|---|
| Body weight x ± s (kg) | 69.1 ± 10.6 | 69.5 ± 10.6 | t = 0.12 | 0.901 |
| BMI x ± s | 24.7 ± 3.0 | 25.1 ± 3.5 | t = 0.41 | 0.678 |
| FPG M($P_{25}$, $P_{75}$) (mmol/L)* | 6.4 (5.8, 7.0) | 7.0 (6.5, 7.7) | z = 2.38 | 0.017 |
| PBG M($P_{25}$, $P_{75}$) (mmol/L)* | 9.9 (9.2, 11.1) | 10.1 (8.9, 11.1) | z = 0.36 | 0.719 |
| TCM score M ($P_{25}$, $P_{75}$)* | 12.0 (5.2, 21.0) | 42.0 (15.5, 65.5) | z = 3.41 | <0.001 |
| DSQL score M ($P_{25}$, $P_{75}$) | 42.0 (29, 75.2) | 49.0 (30.5, 96.5) | z = 0.77 | 0.441 |

Table 10: There were no statistically significant differences in body weight, BMI, and DSQL score between two groups of patients (all P>0.05), and there were statistically significant differences in FPG, PBG and TCM scores (all P<0.05).

TABLE 11

Comparison of all data of patients in Group 1 before and after treatment

| Data of patients in Group 1 | Before treatment (n = 24) | After treatment (n = 24) | Statistic value | P value |
|---|---|---|---|---|
| Body weight x ± s (kg)* | 73.4 ± 11.7 | 69.1 ± 10.6 | t = 10.82 | <0.001 |
| BMI x ± s * | 26.3 ± 3.5 | 24.7 ± 3.0 | t = 10.89 | <0.001 |
| FPG M ($P_{25}$, $P_{75}$) (mmol/L)* | 7.8 (6.9, 9.2) | 7.0 (6.5, 7.7) | z = 4.28 | <0.001 |
| PBGM ($P_{25}$, $P_{75}$) (mmol/L)* | 12.9 (10.4, 13.9) | 9.9 (9.2, 11.1) | z = 4.28 | <0.001 |
| TCM score M ($P_{25}$, $P_{75}$)* | 41.5 (20.0, 63.2) | 12.0 (5.2, 21.0) | z = 4.28 | <0.001 |
| DSQL score M ($P_{25}$, $P_{75}$) | 73.5 (52.2, 111.0) | 42.0 (29, 75.2) | z = 4.28 | <0.001 |

Table 11: There were no statistical differences in body weight, BMI, FPG, PBG, TCM score, and DSQL score between patients in Group 1 before and after treatment (all P<0.001).

TABLE 12

Comparison of all data of patients in Group 2 before and after treatment

| Data of patients in Group 2 | Before treatment (n = 25) | After treatment (n = 25) | Statistic value | P value |
|---|---|---|---|---|
| Body weight x ± s (kg) | 69.5 ± 10.1 | 69.1 ± 10.6 | t = 0.13 | 0.896 |
| BMI x ± s | 25.3 ± 3.0 | 24.7 ± 3.0 | t = 0.81 | 0.435 |
| FPG M ($P_{25}$, $P_{75}$) (mmol/L)* | 8.0 (7.2, 8.7) | 7.0 (6.5, 7.7) | z = 4.18 | <0.001 |
| PBG M ($P_{25}$, $P_{75}$) (mmol/L)* | 11.5 (10.0, 13.7) | 9.9 (9.2, 11.1) | z = 4.29 | <0.001 |
| TCM score M ($P_{25}$, $P_{75}$)* | 42 (23, 70) | 12.0 (5.2, 21.0) | z = 2.83 | 0.005 |
| DSQL score M ($P_{25}$, $P_{75}$)* | 59.0 (41.0, 104.5) | 42.0 (29, 75.2) | z = 3.54 | <0.001 |

Table 12: There were no statistical differences in body weight and BMI between patients in Group 2 before and after treatment (all P>0.05). There were statistical differences in FPG, PBG, TCM score, and DSQL score (all P<0.05).

TABLE 13

Comparison of differences in all data before and after patient treatment

| Difference before and after treatment | Group 1 (n = 24) | Group 2 (n = 25) | Statistic value | P value |
|---|---|---|---|---|
| Body weight x ± s (kg)* | 4.3 ± 1.9 | 0.0 ± 1.5 | t = 8.58 | <0.001 |
| BMI x ± s * | 1.5 ± 0.6 | 0.1 ± 1.1 | t = 4.93 | <0.001 |
| FPG x ± s (mmol/L)* | 1.5 ± 0.8 | 0.9 ± 0.6 | t = 2.91 | 0.005 |
| PBG x ± s (mmol/L)* | 2.4 ± 1.3 | 1.3 ± 0.9 | t = 3.37 | 0.002 |
| TCM score x ± s * | 28.3 ± 13.7 | 4.6 ± 6.3 | t = 7.73 | <0.001 |
| DSQL score x ± s * | 26.2 ± 13.9 | 9.2 ± 10.2 | t = 4.89 | <0.001 |

Table 13: There were statistical significances in differences of all data before and after treatment of both groups of patients (all P<0.05).

TABLE 14

Overall response comparison

| Group | Total (n) | Aggravation [n (%)] | No response [n (%)] | Moderate response [n (%)] | Marked response [n (%)] | Statistic value | P value |
|---|---|---|---|---|---|---|---|
| 1 | 24 | 0(0) | 0(0) | 13(54.2) | 11(45.8) | z = 4.83 | <0.001 |
| 2 | 25 | 4(16.0) | 14(56.0) | 5(20.0) | 2(8.0) | | |

Table 14: The overall response rate of the observation group reached 100%, while that of the control group was only 28%, and there was a difference in overall response between the both groups. The TCM decoction provided by the present disclosure enables effective reverse treatment of patients with type 2 diabetes with pattern of damp-heat brewing in the spleen.

Test Example 4

A typical case in clinical treatment is as follows: Mr. Huang, a 43-year-old male, was initially diagnosed on Oct. 12, 2021. He had a history of diabetes for more than 6 years. He was obese, weighing 104 kg. He was on metformin tablets (500 mg, Bid) and glimepiride tablets (2 mg, Qd) for a long time. In the past six months, blood glucose was not controlled, accompanied by slight numbness of both upper limbs and susceptibility to dry mouth and thirsty. He passed sticky stools hardly twice or thrice a day. He felt a little upset. He did not sleep well at night. He complained of abdominal fullness and distention, fatigue, and weakness. He had a pale red tongue and a thin slimy yellow tongue fur, with bruising sublingual vein. The pulse was rough and slippery. Examinations showed: FBG 8.56 mmol/L and 2h-PBG 12.35 mmol/L. He took the TCM decoction for reducing blood glucose in patients with type 2 diabetes prepared in Example 1 of the present disclosure twice a day, 150 mL for each time, did proper exercise, and adjusted the diet. After continuous treatment for one month, the stool shape was improved; dry mouth and thirst significantly became better than before; weakness and abdominal distension became milder than before; he had a pale red tongue and a thin slimy tongue fur, with slightly bruising sublingual vein; and the pulse was slippery. When reviewed, the FBG was 5.48 mmol/L, and the 2h-PBG was 8.69 mmol/L. When he kept on taking this TCM decoction for three months, the FBG was 4.15 mmol/L, and the 2h-PBG was 8.30 mmol/L; he weighed 93 kg; and glimepiride tablets were withdrawn. When he kept on taking this TCM decoction for six months, his blood glucose level was kept stable, he weighed 85 kg, and metformin tablets were withdrawn. When the TCM decoction was maintained for use and blood glucose monitoring was enhanced, the blood glucose continuously reached the standard, the liver and kidney functions were normal, no complaint was reported, the tongue was pale red with a thin white tongue fur, the bruising sublingual vein was not obvious, and the pulse was moderate.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A traditional Chinese medicine (TCM) composition for treating or reducing the incidence of diabetes, wherein the TCM composition comprises the following raw materials: 3-20 parts by weight of *Rhizoma Coptidis*, 9-24 parts by weight of *Rhizoma Atractylodis*, 6-24 parts by weight of *Feculae Bombycis*, 10-60 parts by weight of *Stigma Maydis*, 10-60 parts by weight of *Radix Trichosanthis*, 6-30 parts by weight of *Radix Scrophulariae*, 10-60 parts by weight of *Radix et Rhizoma Salviae* Miltiorrhizae, and 10-50 parts by weight of *Fructus Crataegi* Preparata.

2. The TCM composition according to claim 1, wherein the TCM composition comprises the following raw materials: 5-15 parts by weight of the *Rhizoma Coptidis*, 12-20 parts by weight of the *Rhizoma Atractylodis*, 10-20 parts by weight of the *Feculae Bombycis*, 20-50 parts by weight of the *Stigma Maydis*, 20-50 parts by weight of the *Radix Trichosanthis*, 10-20 parts by weight of the *Radix Scrophulariae*, 15-35 parts by weight of the *Radix et Rhizoma Salviae* Miltiorrhizae, and 15-35 parts by weight of the *Fructus Crataegi* Preparata.

3. A TCM preparation for treating or reducing the incidence of diabetes, wherein the TCM preparation comprises the TCM composition according to claim 1 and pharmaceutically acceptable excipients.

4. The TCM preparation according to claim 3, wherein the TCM preparation comprises one selected from the group consisting of a decoction, a powder, granules, a tablet, a pill, and a capsule.

5. The TCM preparation according to claim 4, wherein the decoction is prepared according to the following steps:
mixing all the raw materials of the TCM composition with 2-5 times of clean water, boiling, extracting, and filtering to obtain a filtrate, namely the decoction.

6. The TCM preparation according to claim 5, wherein the extracting is repeated 1-3 times, for 20-60 min each time.

7. The TCM preparation according to claim 4, wherein the powder is prepared according to the following steps:
drying all the raw materials of the TCM composition, pulverizing dried raw materials to 50-300 meshes, and mixing well to obtain the powder.

8. The TCM preparation according to claim 4, wherein the granules are prepared according to the following steps:
pulverizing the TCM composition, stirring a pulverized TCM composition well with excipients, passing through a screen, granulating to obtain wet particles, and drying the wet particles to obtain the granules.

9. The TCM composition according to claim 3, wherein the TCM composition comprises the following raw materials: 5-15 parts by weight of the *Rhizoma Coptidis*, 12-20 parts by weight of the *Rhizoma Atractylodis*, 10-20 parts by weight of the *Feculae Bombycis*, 20-50 parts by weight of the *Stigma Maydis*, 20-50 parts by weight of the *Radix*

*Trichosanthis*, 10-20 parts by weight of the *Radix Scrophulariae*, 15-35 parts by weight of the *Radix* et *Rhizoma Salviae* Miltiorrhizae, and 15-35 parts by weight of the *Fructus Crataegi* Preparata.

10. The TCM composition according to claim 9, wherein the TCM preparation comprises one selected from the group consisting of a decoction, a powder, granules, a tablet, a pill, and a capsule.

11. The TCM composition according to claim 10, wherein the decoction is prepared according to the following steps:
   mixing all the raw materials of the TCM composition with 2-5 times of clean water, boiling, extracting, and filtering to obtain a filtrate, namely the decoction.

12. The TCM preparation according to claim 11, wherein the extracting is repeated 1-3 times, for 20-60 min each time.

13. The TCM preparation according to claim 10, wherein the powder is prepared according to the following steps:
   drying all the raw materials of the TCM composition, pulverizing dried raw materials to 50-300 meshes, and mixing well to obtain the powder.

14. The TCM preparation according to claim 10, wherein the granules are prepared according to the following steps:
   pulverizing the TCM composition, stirring a pulverized TCM composition well with excipients, passing through a screen, granulating to obtain wet particles, and drying the wet particles to obtain the granules.

15. A method for treating or reducing the incidence of treating diabetes by using the TCM composition according to claim 1.

16. The method according to claim 15, wherein the diabetes is type 2 diabetes.

17. The method according to claim 15, wherein the TCM composition comprises the following raw materials: 5-15 parts by weight of the *Rhizoma Coptidis*, 12-20 parts by weight of the *Rhizoma Atractylodis*, 10-20 parts by weight of the *Feculae Bombycis*, 20-50 parts by weight of the *Stigma Maydis*, 20-50 parts by weight of the *Radix Trichosanthis*, 10-20 parts by weight of the *Radix Scrophulariae*, 15-35 parts by weight of the *Radix* et *Rhizoma Salviae* Miltiorrhizae, and 15-35 parts by weight of the *Fructus Crataegi* Preparata.

18. A method for treating or reducing the incidence of diabetes by using the TCM preparation according to claim 3.

19. The method according to claim 18, wherein the TCM composition comprises the following raw materials: 5-15 parts by weight of the *Rhizoma Coptidis*, 12-20 parts by weight of the *Rhizoma Atractylodis*, 10-20 parts by weight of the *Feculae Bombycis*, 20-50 parts by weight of the *Stigma Maydis*, 20-50 parts by weight of the *Radix Trichosanthis*, 10-20 parts by weight of the *Radix Scrophulariae*, 15-35 parts by weight of the *Radix* et *Rhizoma Salviae* Miltiorrhizae, and 15-35 parts by weight of the *Fructus Crataegi* Preparata.

20. The method according to claim 18, wherein the diabetes is type 2 diabetes.

* * * * *